(12) United States Patent
Gastaldi

(10) Patent No.: US 7,158,185 B2
(45) Date of Patent: Jan. 2, 2007

(54) METHOD AND APPARATUS FOR TAGGING MEDIA PRESENTATIONS WITH SUBSCRIBER IDENTIFICATION INFORMATION

(75) Inventor: Diego Gastaldi, Suwanee, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 699 days.

(21) Appl. No.: 09/847,016

(22) Filed: May 1, 2001

(65) Prior Publication Data

US 2002/0165983 A1    Nov. 7, 2002

(51) Int. Cl.
*H04N 7/0087* (2006.01)

(52) U.S. Cl. .................. 348/435.1; 348/478; 348/460; 380/202; 725/22

(58) Field of Classification Search ................ 719/315; 709/200–203, 217–226, 231–236; 345/327; 348/12, 478, 435.1, 460; 380/201–203; 725/22
See application file for complete search history.

(56) References Cited

U.S. PATENT DOCUMENTS

| | | | | |
|---|---|---|---|---|
| 4,450,477 A * | 5/1984 | Lovett | ......................... | 725/93 |
| 4,554,579 A * | 11/1985 | Citta | ......................... | 725/131 |
| 4,595,950 A * | 6/1986 | Lofberg | ..................... | 380/202 |
| 4,734,764 A * | 3/1988 | Pocock et al. | ................. | 725/98 |
| 4,829,569 A * | 5/1989 | Seth-Smith et al. | ........ | 380/234 |
| 4,890,319 A * | 12/1989 | Seth-Smith et al. | ........ | 380/202 |
| 5,257,396 A * | 10/1993 | Auld et al. | ................. | 725/139 |
| 5,418,853 A * | 5/1995 | Kanota et al. | .............. | 380/203 |
| 5,497,187 A * | 3/1996 | Banker et al. | .............. | 725/144 |
| 5,600,378 A | 2/1997 | Wasilewski | .................. | 348/468 |
| 5,627,655 A * | 5/1997 | Okamoto et al. | ............. | 386/94 |
| 5,724,525 A * | 3/1998 | Beyers et al. | ................. | 705/40 |
| 5,778,140 A * | 7/1998 | Okamoto et al. | ............. | 386/94 |
| 5,818,438 A * | 10/1998 | Howe et al. | ................. | 715/718 |
| 5,822,425 A * | 10/1998 | Ezaki et al. | .................. | 386/94 |
| 5,880,720 A * | 3/1999 | Iwafune et al. | .............. | 725/24 |
| 5,907,366 A * | 5/1999 | Farmer et al. | ............. | 348/478 |
| 5,929,922 A * | 7/1999 | Stevens et al. | ............. | 348/485 |
| 5,995,092 A * | 11/1999 | Yuen et al. | .................... | 725/40 |
| 6,064,440 A * | 5/2000 | Born et al. | ................. | 348/478 |
| 6,141,693 A * | 10/2000 | Perlman et al. | ............. | 709/236 |
| 6,249,914 B1 * | 6/2001 | Harrison et al. | ............ | 725/141 |
| 6,285,774 B1 * | 9/2001 | Schumann et al. | ......... | 382/100 |
| 6,374,036 B1 * | 4/2002 | Ryan et al. | .................... | 386/94 |
| 6,598,228 B1 * | 7/2003 | Hejna, Jr. | ..................... | 725/91 |
| 6,701,062 B1 * | 3/2004 | Talstra et al. | ................. | 386/94 |
| 6,829,782 B1 * | 12/2004 | Reams | ........................ | 725/106 |
| 6,912,652 B1 * | 6/2005 | Ito et al. | ..................... | 713/151 |
| 6,928,165 B1 * | 8/2005 | Takai | ......................... | 380/201 |

OTHER PUBLICATIONS

Panabaker, R. et al. "The Transmission of IP over the Vertical Blanking Interval of a Television Signal." Network Working Group. Nov. 1999.*

* cited by examiner

*Primary Examiner*—Lewis A. Bullock, Jr.

(57) ABSTRACT

A system that inserts subscriber identification information includes, in a preferred embodiment, a system with a memory for storing subscriber identification information and a processor configured to insert the subscriber identification information into a media presentation to improve traceability of copied presentations to a subscriber.

16 Claims, 8 Drawing Sheets

METHOD AND APPARATUS FOR TAGGING MEDIA PRESENTATIONS WITH SUBSCRIBER IDENTIFICATION INFORMATION

TECHNICAL FIELD

The present invention is generally related to television systems and, more particularly, is related to a method and apparatus for tagging media presentations with subscriber identification information.

BACKGROUND OF THE INVENTION

With recent advances in digital transmission technology, cable television systems are now capable of providing much more than the traditional analog broadcast video. In implementing enhanced programming, the home communication terminal ("HCT"), otherwise known as the set-top box, has become an important computing device for accessing video services and navigating a subscriber through a maze of available services. In addition to supporting traditional analog broadcast video functionality, digital HCTs (or "DHCTs") now also support an increasing number of two-way digital services such as video-on-demand.

Typically, a DHCT is connected to a cable or satellite television network and includes hardware and software necessary to provide the functionality of the digital television system at the client's site. Preferably, some of the software executed by a DHCT is downloaded and/or updated via the cable television network. Each DHCT also typically includes a processor, communication components and memory, and is connected to a television or other display device, such as a personal computer. While many conventional DHCTs are stand-alone devices that are externally connected to a television, a DHCT and/or its functionality may be integrated into a television or personal computer, as will be appreciated by those of ordinary skill in the art.

A headend unit comprising one or more servers receives media and data from service providers via a plurality of network interfaces such as satellite, terrestrial, telephone, and the Internet. A headend unit server process receives media and data and then transmits media and data to one or more DHCTs.

Media services organizations and studio operators are concerned about pirate copies of new releases that can appear as a consequence of releasing new titles to be sold as Pay Per View or Video On Demand programs (also referred to as events or instances, typically delivered in a "session" with the head end). This is especially true in digital systems, in which the copied events are as good as the original. Encryption (in digital systems) and scrambling (in analog systems) is a method to prevent unauthorized viewing and/or listening to an event. Typically, viewers with authorized codes, which are downloaded to the set-top to decrypt or de-scramble the event signal (i.e. for paying customers), may watch and/or listen to the event. However, unauthorized copying is generally not directly addressed by this technology, just unauthorized viewing at the time of transmission.

Watermarking is another method to protect some types of content. Watermarking often includes embedding information into multimedia data to identify the owner of the intellectual property rights to the content, such as in a digital file of a watermarked photograph. Unfortunately, identifying the owner does not often deter the original copyist.

Thus, a heretofore unaddressed need exists in the industry to address the aforementioned deficiencies and inadequacies.

SUMMARY OF THE INVENTION

The preferred embodiment of the present invention includes a system that inserts subscriber identification (ID) information. The preferred embodiment of the present invention includes a system with a memory for storing subscriber identification information and a processor configured to insert the subscriber identification information into a media presentation to allow traceability of copied presentations to a subscriber.

The preferred embodiment of the present invention also provides a method for inserting subscriber identification information into media presentations. In this regard, the method can be broadly summarized by the following steps: receiving subscriber identification information, storing subscriber identification information in memory, receiving a subscriber request for a media presentation, and inserting the subscriber identification information into the media presentation requested by the subscriber. Implementations preferably include a media services client device or media services server device performing the above described method.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENT

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Furthermore, all "examples" given herein are intended to be non-limiting in the sense that other examples are also included in the scope of the invention.

Figure 1:
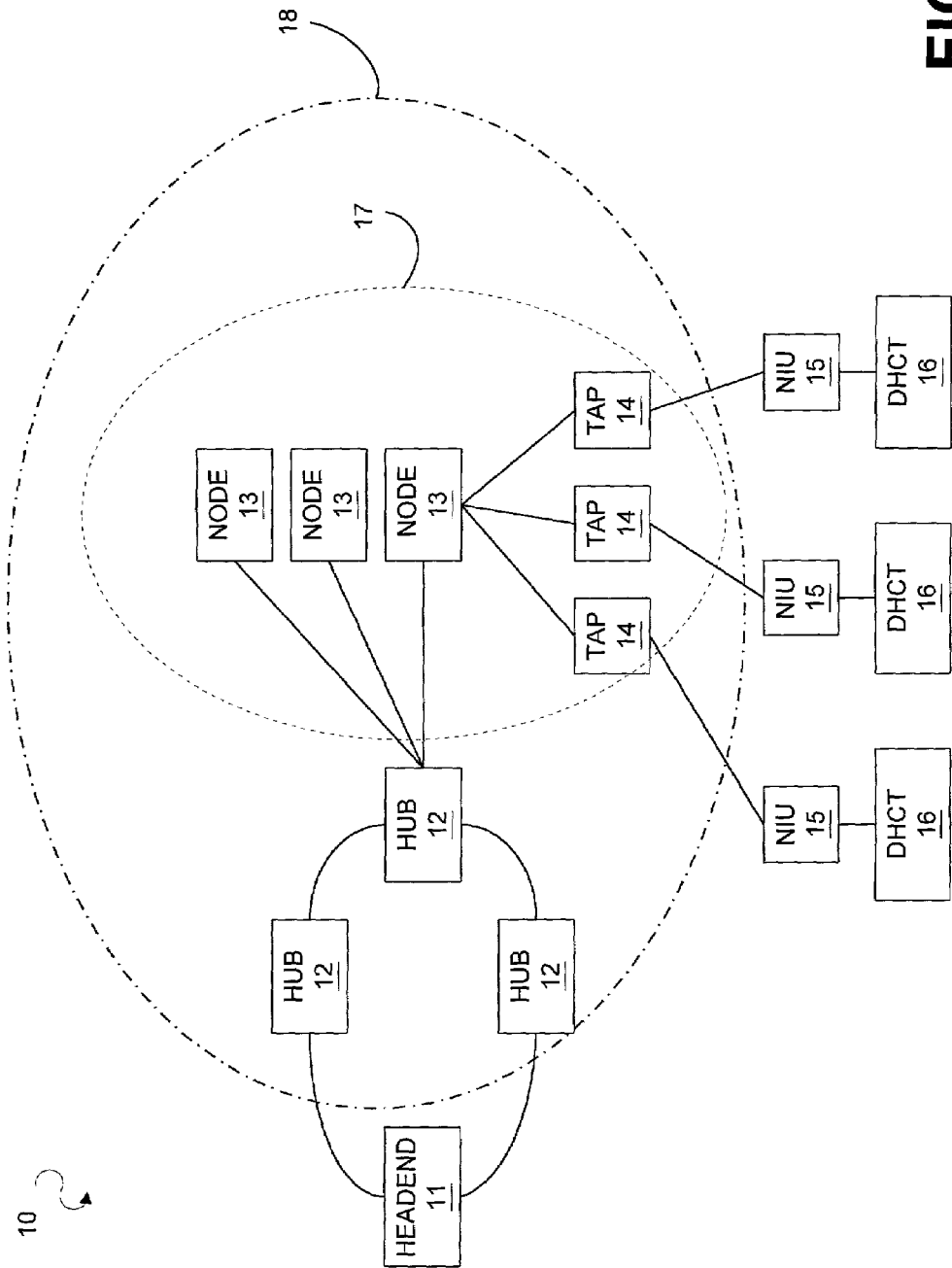
FIG. 1 depicts a block diagram of a cable television system in accordance with one preferred embodiment of the present invention.

The present invention is generally implemented as part of a cable television system (CTS). Hence, an illustrative CTS 10 and its operation will be described initially. FIG. 1 shows a block diagram view of a CTS 10, which is generally a high quality, reliable and integrated network system that preferably features video, audio, voice and data services to cable television subscribers. Although FIG. 1 depicts a high level view of a CTS 10, it should be appreciated that a plurality of cable television systems can tie together a plurality of regional networks into an integrated global network so that cable television subscribers can preferably receive content provided from anywhere in the world.

The CTS 10 delivers broadcast video signals as digitally formatted signals in addition to delivering traditional broadcast analog video signals. Furthermore, the system can support one way broadcast services as well as both one-way data services and two-way media and data services. The two-way operation of the network allows for subscriber interactivity with services, such as Pay-Per-View programming (PPV), Near Video-On-Demand (NVOD) programming according to any of several known NVOD implementation methods, View-on-Demand (VOD) programming (according to any of several known VOD implementation methods), and interactive applications, such as internet connections.

The CTS 10 also provides the interfaces, network control, transport control, session control, and servers to access content and services, and distributes content and services to cable television subscribers. As shown in FIG. 1, a typical CTS 10 comprises a headend 11, hubs 12, an HFC access network 17, and subscribers' digital home communication terminals (DHCTs) 16. It should be appreciated that although a single components (e.g. a headend 11) is illustrated in FIG. 1, a CTS 10 can feature a plurality of any one of the illustrated components or may be configured with alternative embodiments for any one of the individual components or with yet other additional components not enumerated above. A content provider (not shown) transmits media content to a headend for further transmission to subscribers in the network.

Content provided by a content provider may be communicated by the content provider to one or more headends 11. From those headends 11 the content is then communicated over a communications network 18 that includes a plurality of HFC access networks 17 (only one HFC access network 17 is illustrated). The HFC access network 17 typically comprises a plurality of HFC nodes 13, each of which may serve a local geographical area. The hub 12 connects to the HFC node 13 through a fiber portion of the HFC access network 17. The HFC node 13 is connected to a tap 14 which is connected to a network interface unit (NIU) 15 which is connected to a DHCT 16. The NIU 15 is a normally located on the subscriber's premises and provides a transparent interface between the HFC node 13 and the subscribers' internal wiring. Coaxial cables are typically used to couple nodes 13, taps 14 and NIUs 15 because the electrical signals can be easily repeated with radio frequency (RF) amplifiers.

As the high-level operation of CTSs is well known to those of skill in the art, further description of the overall CTS 10 of FIG. 1 will not be contained herein. It will be appreciated, however, that the CTS 10 shown in FIG. 1 is merely illustrative and should not be construed as implying any limitations upon the scope of the present invention.

Figure 2:
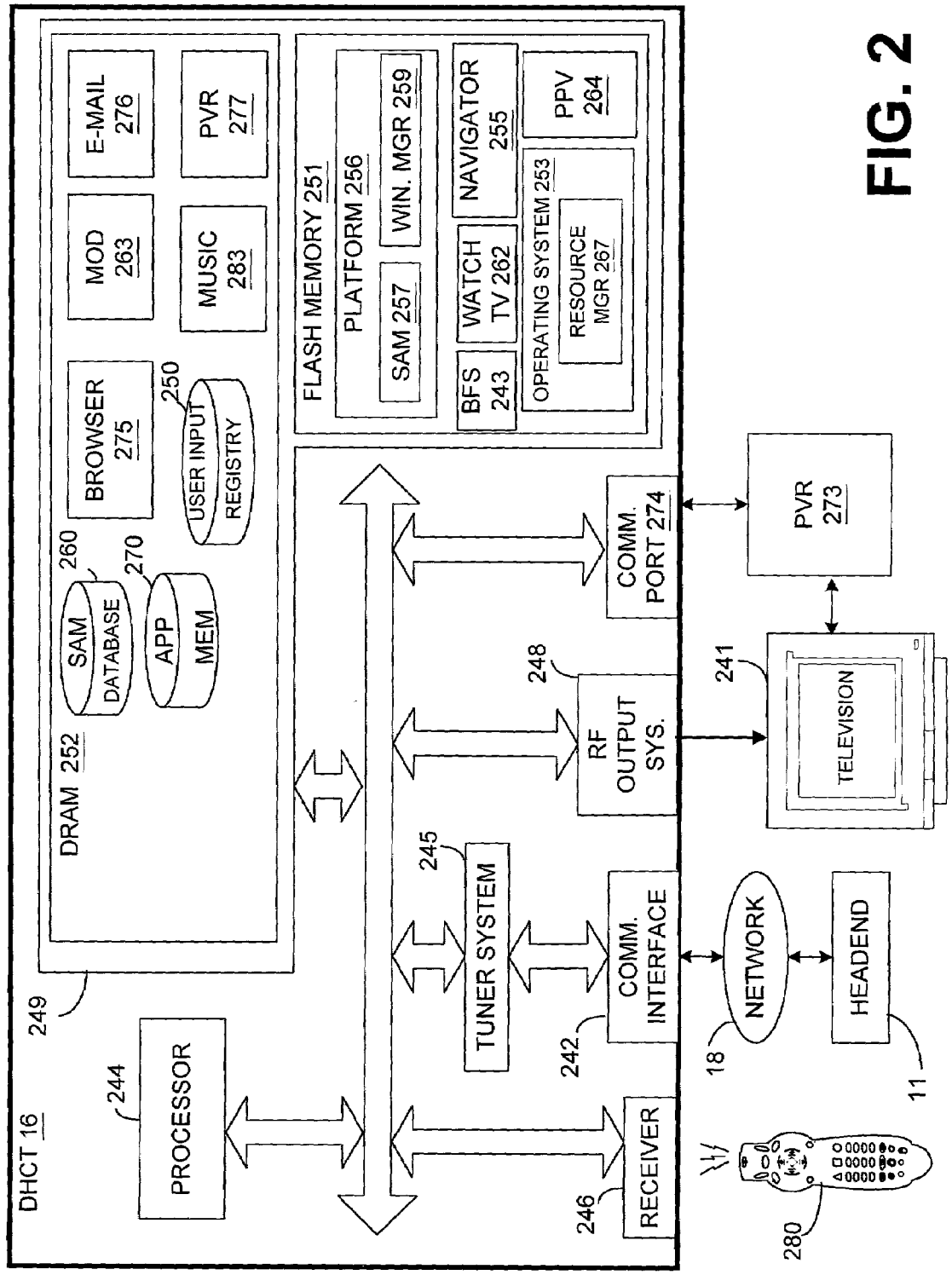
FIG. 2 depicts a block diagram of the DHCT depicted in FIG. 1 and related equipment, in accordance with one embodiment of the present invention.

FIG. 2 is a block diagram illustrating a DHCT 16 that is coupled to a headend 11 and to a television 241 and to a personal video recorder (PVR) 273. A personal video recorder is a video recorder for recording video presentations. In an alternative embodiment, PVR functionality is integrated into the DHCT 16, or vice versa, or omitted entirely. Some of the functionality performed by applications executed in the DHCT 16 (such as, by way of non-limiting example, the MOD client application 263) may instead be performed at the headend 11 and vice versa. A DHCT 16 is typically situated at a user's residence or place of business and may be a stand-alone unit or integrated into another device such as, for example, a television set or a personal computer. The DHCT 16 preferably includes a communications interface 242 for receiving signals (video, audio and/or other data) from the headend 11 through the network 18 and for providing any reverse information to the headend 11 through the network 18.

The DHCT 16 further includes at least one processor 244 for controlling operations of the DHCT 16, an RF output system 248 for driving the television display 241, and a tuner system 245 for tuning into a particular television channel to be displayed and for sending and receiving various types of data or media to and from the headend 11. The tuner system 245 includes, in one implementation, an out-of-band tuner for bi-directional quadrature phase shift keying (QPSK) data communication and a quadrature amplitude modulation (QAM) tuner (in-band) for receiving television signals. Additionally, a receiver 246 receives externally-generated information, such as user inputs or commands from other devices.

The DHCT 16 may also include one or more wireless or wired interfaces, also called communication ports 274, for receiving and/or transmitting data to other devices. For instance, the DHCT 16 may feature USB (Universal Serial Bus), Ethernet (for connection to a computer), IEEE-1394 (for connection to media devices in an entertainment center), serial, and/or parallel ports. The user inputs may, for example, be provided by a computer or transmitter with buttons or keys located either on the exterior of the terminal or by a hand-held remote control device or keyboard that includes user-actuated buttons.

In one implementation, the DHCT 16 includes system memory 249, which includes flash memory 251 and dynamic random access memory (DRAM) 252, for storing various applications, modules and data for execution and use by the processor 244. Basic functionality of the DHCT 16 is provided by an operating system 253 that is primarily stored in flash memory 251. Among other things, the operating system 253 includes at least one resource manager 267 that provides an interface to resources of the DHCT 16 such as, for example, computing resources.

An application referred to as navigator 255 is also resident in flash memory 251 for providing a navigation framework for services provided by the DHCT 16. The navigator 255 registers for and in some cases reserves certain user inputs related to navigational keys such as channel increment/ decrement, last channel, favorite channel, etc. The navigator 255 also provides users with television related menu options that correspond to DHCT 16 functions such as, for example, providing an interactive program guide, blocking a channel or a group of channels from being displayed in a channel menu, and displaying a video-on-demand purchase list.

The flash memory 251 also contains a platform library 256. The platform library 256 is a collection of utilities useful to applications, such as a timer manager, a compression manager, a configuration manager, an HTML parser, a database manager, a widget toolkit, a string manager, and other utilities (not shown). These utilities are accessed by applications via application programming interfaces (APIs) as necessary so that each application does not have to contain these utilities. Two components of the platform library 256 that are shown in FIG. 2 are a window manager 259 and a service application manager client (SAM) 257.

The window manager 259 provides a mechanism for implementing the sharing of the screen regions and user input. The window manager 259 in the DHCT 16 is responsible for, as directed by one or more applications, implementing the creation, display, and de-allocation of the limited DHCT 16 screen resources. It allows multiple applications to share the screen by assigning ownership of screen regions, or windows. The window manager 259 also maintains, among other things, a user input registry 250 in DRAM 252 so that when a user enters a key or a command via the remote control device 280 or another input device such as a keyboard or mouse, the user input registry 250 is accessed to determine which of various applications running on the DHCT 16 should receive data corresponding to the input key and in which order. As an application is executed, it registers a request to receive certain user input keys or commands. When the user presses a key corresponding to one of the commands on the remote control device 280, the command is received by the receiver 246 and relayed to the processor 244. The processor 244 dispatches the event to the operating system 253 where it is forwarded to the window manager 259 which ultimately accesses the user input registry 250 and routes data corresponding to the incoming command to the appropriate application.

The SAM client 257 is a client component of a client-server pair of components, with the server component being located at the headend 11. A SAM database 260 in DRAM 252 includes a data structure of services and a data structure of channels that are created and updated by the headend 11. Many services may be defined using the same application component, with different parameters. Examples of services include, without limitation and in accordance with one implementation, presenting television programs (available through a WatchTV application 262), pay-per-view events (available through a PPV application 264), digital music (283), media-on-demand (available through an MOD application 263), and an interactive program guide (not shown). In general, the identification of a service includes the identification of an executable application that provides the service along with a set of application-dependent parameters that indicate to the application the service to be provided. As a non-limiting example, a service of presenting a television program could be executed with a set of parameters to view HBO or with a separate set of parameters to view CNN. Each association of the application component (tune to program) and one parameter component (HBO or CNN) represents a particular service that has a unique service I.D. The SAM client 257 also interfaces with the resource manager 267, as discussed below, to control resources of the DHCT 16.

Application clients can also be downloaded into DRAM 252 at the request of the SAM client 257, typically in response to a request by the user or in response to a message from the headend 11. In this non-limiting example DRAM 252 contains a media-on-demand application (MOD) 263, an e-mail application 276, and a web browser application 275, among others. It should be clear to one with ordinary skill in the art that these applications are not limiting and merely serve as examples for this present embodiment of the invention. Furthermore, one or more DRAM based applications may, as an alternative embodiment, be resident in flash memory 251. The client applications may be resident in flash memory 251 or downloaded into DRAM 252. These applications, and others provided by the cable system operator, are top-level software entities on the network for providing services to the user.

In one implementation, applications executing on the DHCT 16 work with the navigator 255 by abiding by several guidelines. First, an application utilizes the SAM client 257 for the provision, activation, and suspension of services. Second, an application shares DHCT 16 resources with other applications and abides by the resource management policies of the SAM client 257, the operating system 253, and the DHCT 16. Third, an application handles situations where resources are only available with navigator 255 intervention. Fourth, when an application loses service authorization while providing a service, the application suspends the service via the SAM 257 (the navigator 255 will reactivate an individual service application when it later becomes authorized). Finally, an application client is designed to not have access to certain user input keys reserved by the navigator 255 (i.e., power, channel +/−, volume +/−, etc.).

Figure 3:
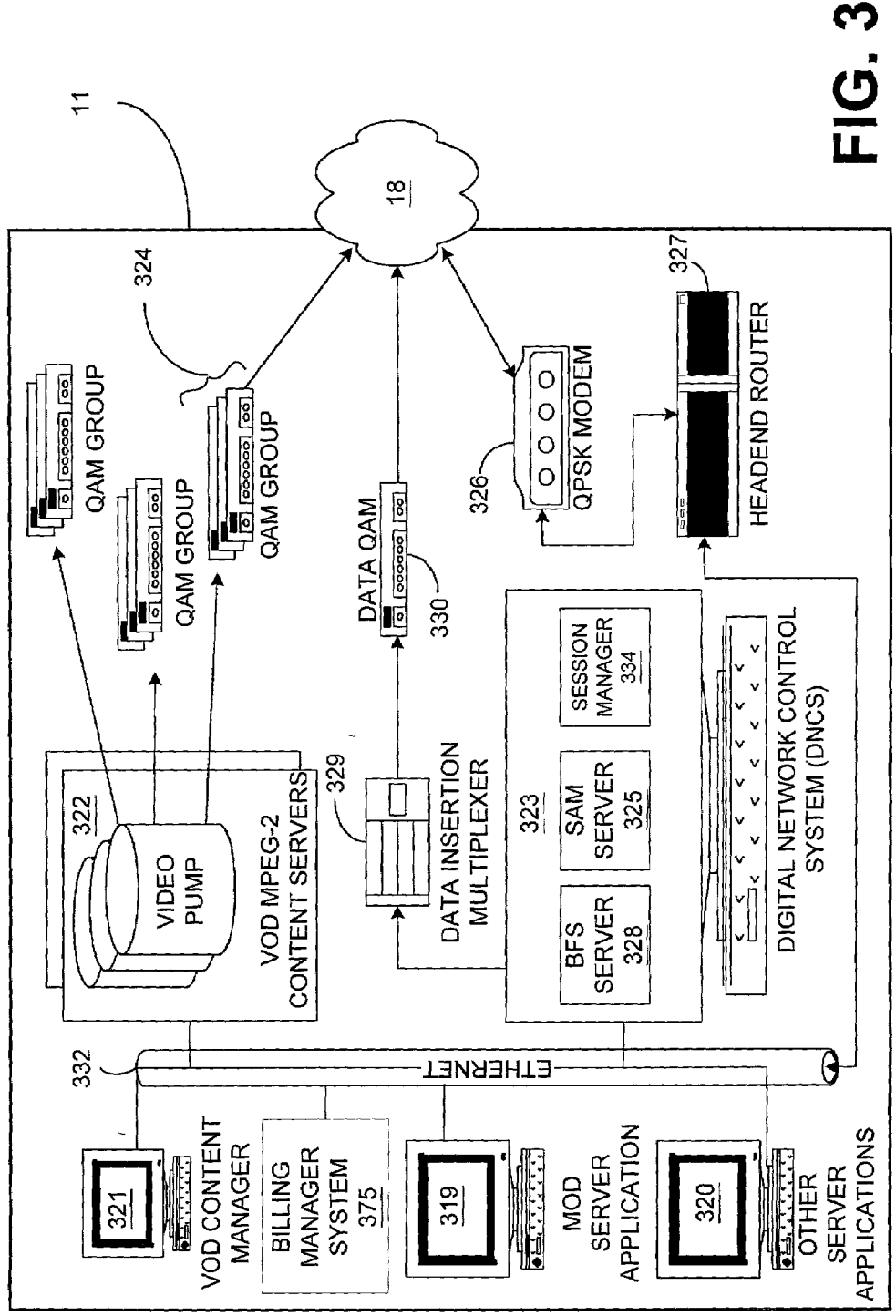
FIG. 3 depicts a block diagram of the headend depicted in FIG. 1 and related equipment, in accordance with one embodiment of the present invention.

The MOD client application 263 provides the user with lists of available titles to choose from and with video presentations requested by the user. The MOD client application 263 provides video presentations to the user by engaging, preferably, in a direct two-way IP (Internet Protocol) connection with VOD content servers 322 (FIG. 3).

Figure 2A:
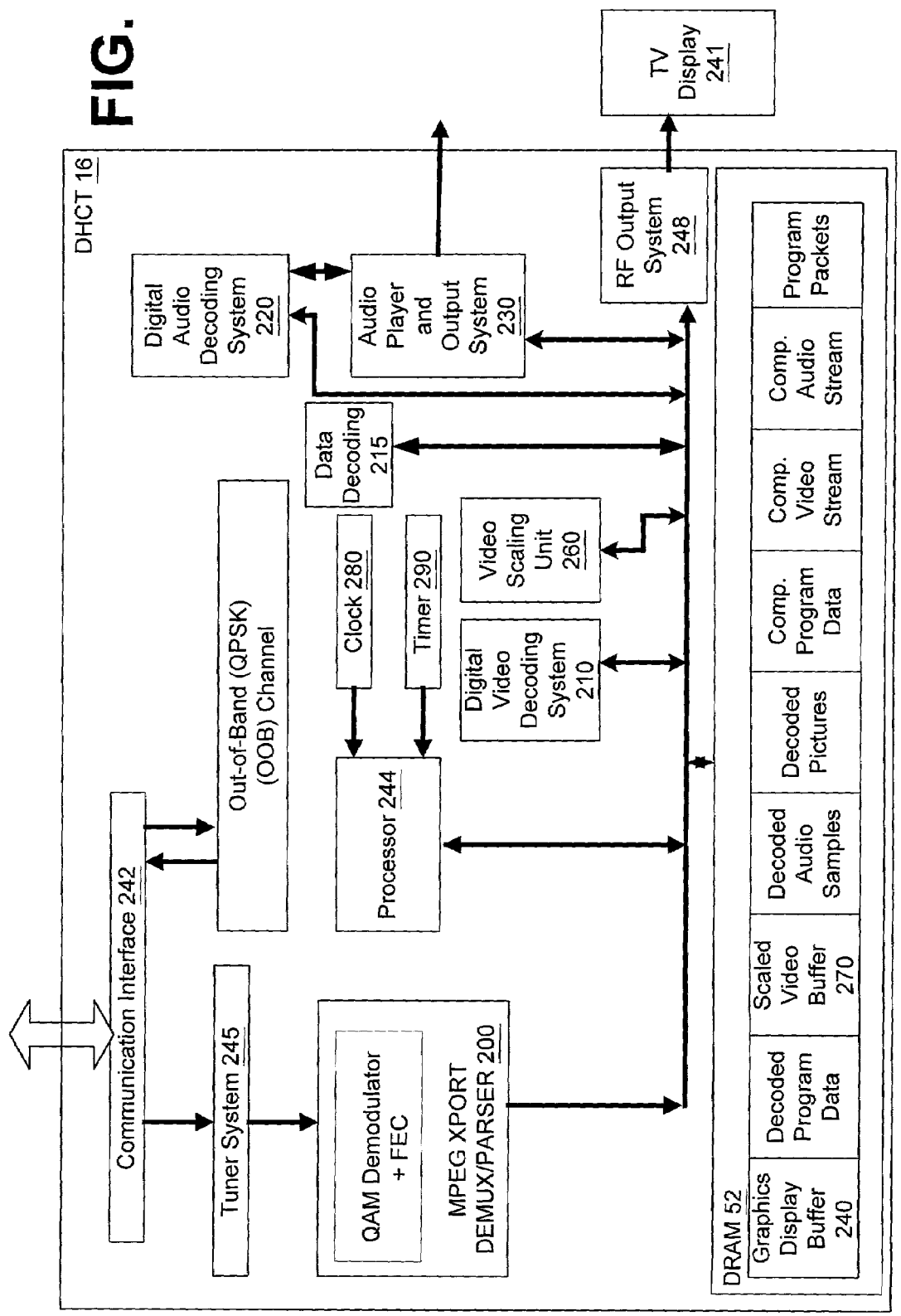
FIG. 2A depicts a block diagram of selected elements of the DHCT depicted in FIG. 2.

FIG. 2A is another depiction of selected elements of DHCT 16. DHCT 16 includes a tuner system 245 that can select one of a plurality of transmission channels provided by a broadband network such as a Digital cable TV network or a Digital Broadband Delivery System (DBDS). Tuner system 245 enables the DHCT 16 to tune to upstream media and data transmissions, thereby allowing a user to receive digital or analog video programs and associated content transmitted via the DBDS.

The DHCT 16 includes a demultiplexing system 200 comprising functionality for QAM demodulation, forward error correction (FEC), transport demultiplexing and parsing. Transport demultiplexing may include MPEG-2 transport demultiplexing. The DHCT 16 also includes a digital video decoding system 210, a digital audio decoding system 220, a display output system such as RF output system 248, an "audio player and output system" 230 that can feed audio samples to RF output system 248, and a processor 244.

The demultiplexing system 200 in communication with communication interface 242, tuner system 245 and processor 244 effects reception of compressed video streams, compressed audio streams, and compressed data streams corresponding to a first video program to be separated from other programs and/or streams transported in the tuned transmission channel and to be stored in a first part of DRAM 252 of DHCT 16 assigned to receive packets of a first video program.

The demultiplexing system 200 in communication with the digital video decoding system 210 and processor 244 effects notification and/or transfer of received packets of one or more compressed video streams corresponding to a first video program from a first part of DRAM 252 to a second part of DRAM 252 assigned to digital video decoding system 210. The demultiplexing system 200 in communication with the digital audio decoding system 220 and processor 244 effects notification and/or transfer of received packets of one or more compressed audio streams corresponding to a first video program from a first part of DRAM 252 to a third part of DRAM 252 assigned to digital audio decoding system 220. The demultiplexing system 200 in communication with data decoding system 215 and processor 244 effects notification and/or transfer of received packets of one or more data streams corresponding to a first video program from a first part of DRAM 252 to a fourth part of DRAM 252 assigned for reception of data affiliated with a first video program.

The digital video decoding system 210 reads compressed video stored in a second part of DRAM 252 assigned to digital video decoding system 210 and effects decompression and reconstruction of compressed digital video streams into an assigned fifth part of DRAM 252, and in communication with the display output system (such as RF output system 248) effects presentation of video pictures in television 241. The digital audio decoding system 220 reads compressed audio stored in a third part of DRAM 252 assigned to the digital audio decoding system 220 and effects decompression and reconstruction of compressed digital audio streams into an assigned sixth part of DRAM 252, and in communication with the audio player and output system 230 effects presentation of audio sample to television 41 and/or other audio output interfaces (not shown) in DHCT 16. The digital audio decoding system 215 reads compressed data stored in a fourth part of DRAM 252 assigned to the digital data decoding system 215 and effects decompression and reconstruction of compressed digital data streams into an assigned seventh part of DRAM 252, and in communication with the audio player and output system 230 effects presentation of audio sample to television 41 and/or other audio output interfaces (not shown) in DHCT 16.

The DHCT 16 has an internal clock 280 and timers 290 that enable computation of the time relationship between its internal clock and clock specified by digital video program. Hence, by reading and interpreting the clock and time stamps specifications intrinsic in the digital video program (for example, as provisioned in MPEG-2), or as communicated by the head end 11 via the out of band pathway or channel, the DHCT 16 can effect an output as a synchronized presentation to the user that includes the reconstructed on-demand video pictures, the reconstructed digital audio samples, the subscriber identification information, and supplementary information.

An executable program or algorithm corresponding to an operating system (OS) component, or to a client platform component, or to a client application, or to respective parts thereof, can reside in and execute out of DRAM 252 and/or flash memory 251. Likewise, data inputted into or outputted from any executable program can reside in DRAM 252 or flash memory 251. Furthermore, an executable program or algorithm corresponding to an OS component, or to a client platform component, or to a client application, or to respective parts thereof, can reside in flash memory 251, or in a local storage device connected to DHCT 16 and can be transferred into DRAM 252 for execution. Likewise, data input for an executable program can reside in flash memory 251 or a storage device and can be transferred into DRAM 252 for use by an executable program or algorithm. In addition, data outputted by an executable program can be written into DRAM 252 by an executable program or algorithm and can be transferred into flash memory 251 or into a storage device for storage purposes. The present invention is not limited by where or how data and/or applications are stored or retrieved.

FIG. 3 is a block diagram of the headend depicted in FIG. 1 and related equipment, in accordance with one embodiment of the present invention. While the preferred embodiment of this invention describes media-on-demand applications, the principles, architecture, and method of this invention can be applied to PPV applications and other applications that provide other services to identified subscribers. In the system headend 11, the MOD server application 319 and a plurality of other application servers 320 are connected to a digital network control system (DNCS) 323 via an Ethernet connection 332. The MOD server application 319 is responsible for the following: reserving and configuring system resources needed to provide MOD services, for packaging, configuring and making available to the system the MOD application client executables 263 (FIG. 2), for providing configuration and service data (such as a catalog of titles available for rent) to MOD application clients 263, and for storing data at the request of an MOD application client 263. Each MOD application client 263 executing on a DHCT 16 includes a user interface giving the subscriber the capability to browse, purchase, and access media content such as movies, CDs, video clips, etc. This may require, among other things, engaging, preferably, in a direct two-way IP (Internet Protocol) connection with VOD content servers 322.

The DNCS 323 provides the processing for the head end 11, including complete management, monitoring, and control of the network's elements and broadcast services provided to users. In one implementation, the DNCS 323 uses a data insertion multiplexer 329 and a data QAM 330 to insert in-band broadcast file system (BFS) data into an MPEG-2 transport stream that is broadcast and received via DHCT's communication interface 242 and tuner system 245. The DNCS 323 also contains a session manager 334 that uses Digital Storage Media Command and Control (DSMCC) protocol to set up and maintain MOD sessions. The session manager 334 processes user to network (U–N) session signaling messages, manages allocation of session-related network resources, supports network management operations, acts as a point of contact to the network for the DHCT's 16 in the network 18 to establish individual sessions, and supports MOD services by providing the signaling interface to establish, maintain and release client initiated exclusive sessions (by way of non-limiting example, a VOD presentation).

A service application manager (SAM) server 325 is a server component of a client-server pair of components, with the client component being located at the DHCT 16. Together, the client-server SAM components provide a system in which the user can access services, which are identified by an application to run and a parameter, such as particular data content, specific to that service. The client-server SAM components also manage the life cycle of the applications on the system, including the definition, activation, and suspension of services they provide and the downloading of the applications into the DHCT 16 as necessary.

Applications on both the headend 11 and the DHCT 16 can access the data stored in a broadcast file system (BFS) server 328 in a similar manner to a file system found on operating systems. The BFS server 328 is a part of a broadcast file system that has a counterpart BFS client module 243 (FIG. 2) in a DHCT 16 connected to the network 18. The BFS server 328 repeatedly sends data for applications on a data carousel (not shown) over a period of time in cyclical repeated fashion so that a DHCT 16 that is in need of reading any particular data file or parts thereof may receive it when requested by a user or one or more of its internal running processes.

MPEG-2 transport may be used to multiplex video, audio, and data in digital transmission channels such as channels transmitted downstream employing quadrature amplitude modulation (QAM). An MPEG-2 transport stream allows multiplexing of digital video, digital audio, and data. Multiple different video programs, each with one or more digital video streams, one or more digital audio streams, and/or multiple data streams can be multiplexed and transmitted over the same 6 MHz (or 8 MHz) RF frequency in which the DHCT tuner system 245 tunes to. Hence, a digital transmission channel can carry the video, audio, and data streams of programs of multiple television (TV) stations or on-demand video programs.

A VOD content manager 321 is responsible for managing the content on the VOD content servers 322. The MOD server application 319 controls both the VOD content manager 321 and the VOD content servers 322 and utilizes them to help deliver the video and audio streams that make up VOD services. In one embodiment, a MOD content manager and MOD content servers (not shown) could run respectively in parallel to the VOD content manager 321 and VOD content servers 322 to manage other types of on-demand media content. In an alternate embodiment a MOD content manager replaces the VOD content manager 321 and the MOD content servers replaces the VOD content servers 322. The QAM modulators that comprise the QAM group 324 receive the MPEG-2 transport streams from the VOD content servers 322, convert them into encrypted RF signals at a specified frequency (channel), and transmit them to a DHCT 16 via the network 18.

A Quadrature Phase-Shift Keying (QPSK) modem 326 is responsible for transporting the out-of-band, preferably IP (Internet protocol), datagram traffic between the distribution headend 11 and a DHCT 16. Data from the QPSK modem 326 is routed by headend router 327 within the headend 11. The headend router 327 is also responsible for delivering upstream application traffic to the various server applications 319 & 320.

Billing Manager System 375 provides storage for all subscriber identification information, including subscriber identification information. Billing manager system may alternatively be external to the head end 11.

Each of the above mentioned applications comprises executable instructions for implementing logical functions and can be embodied in any computer-readable medium for use by or in connection with an instruction execution system, apparatus, or device, such as a computer-based system, processor-containing system, or other system that can fetch and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner, and then stored in a computer memory.

Figure 4:
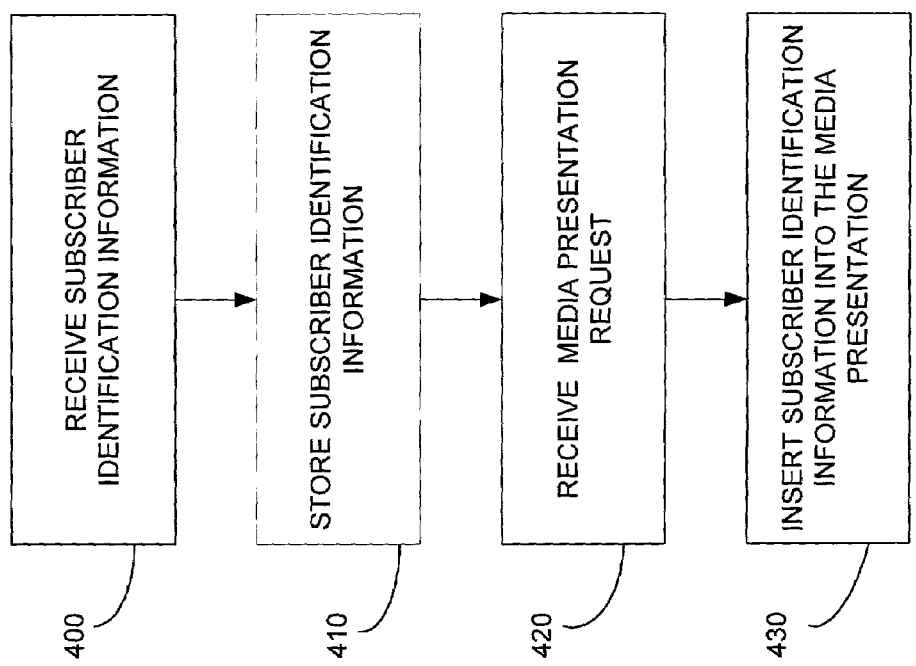
FIG. 4 generally illustrates a method for tagging media presentations with subscriber identification information, in accordance with one embodiment of the invention.

FIG. 4 illustrates a general method for inserting subscriber ID information into media presentations. Step 400 includes receiving subscriber identification information. In the preferred embodiment, step 400 simply entails the user entering the subscriber identification information at the DHCT 16 at the DHCT 16 initialization. At initialization, the DHCT 16 may request from the DNCS 323 (FIG. 3) of the head end 11 a configuration to operate in the network 18, and if the DNCS 323 confirms the DHCT 16 as an authorized device on the network 18, the DNCS 323 sends back a confirmation along with operation parameters to operate on the network 18. The DHCT 16 allows the user, through the client application, to enter subscriber ID information through a graphics user interface (GUI) displayed on a display device. The GUI is effected by the particular client application associated with the service the subscriber seeks to use. The subscriber may enter subscriber ID information, as prompted by the DHCT 16, via a remote 280 (FIG. 2) or wireless terminal (not shown) communicating with the receiver 246 of the DHCT 16, or any other input device. The subscriber ID information may comprise personal data from one or more users of the DHCT 16, such as, but not limited to, the user's name, address, social security number, and/or telephone number. Alternatively, the subscriber ID information may just be a number or other designation recognized by the head end 11. Further, different users of the particular DHCT 16 may have different PIN numbers that they are prompted to enter (or have entered for them) at initialization. These PIN numbers may be used to enable or deny access to certain content or content streams. The subscriber ID information may also include these individualized PIN numbers.

Step 410 includes storing the subscriber identification information in memory. Preferably, the subscriber ID information may be stored directly into system memory 249 of the DHCT 16, in flash 251 or DRAM 252 (FIG. 2) for later retrieval for insertion into a requested video presentation.

Step 420 includes receiving a media presentation request. At any time after the DHCT 16 initialization, the user may request certain media services that the user is authorized to access. Preferably, the user enters a media service selection at the DHCT 16 via a graphical user interface screen and a remote control device 280 or other input device. The DHCT 16 communicates this request via an out of band path to the head end 11. The head end 11 processes this request, and prepares the media presentation for delivery, including but not limited to identifying the media access control (MAC) address of the requesting DHCT 16 and subsequent billing for the media presentation purchase as well as signal processing functions such as compression and/or encryption/scrambling of the media presentation.

Step 430 includes inserting the subscriber identification information into the media presentation. After the DHCT 16 has received the media presentation from the head end 11 QAM group 324 to the DHCT 16 via the communications interface 242 and tuner system 245 (FIG. 2), the media presentation may undergo further processing to counter the signal processing functions that occurred at the head end 11, including but not limited to demultiplexing the media presentation, decrypting or descrambling the media presentation, error correction, and/or decompressing, or decoding, the media presentation. The stored subscriber identification information is retrieved from the system memory 249, and inserted into the media presentation, preferably during the vertical blanking interval of the presentation of the requested media presentation.

Figure 5:
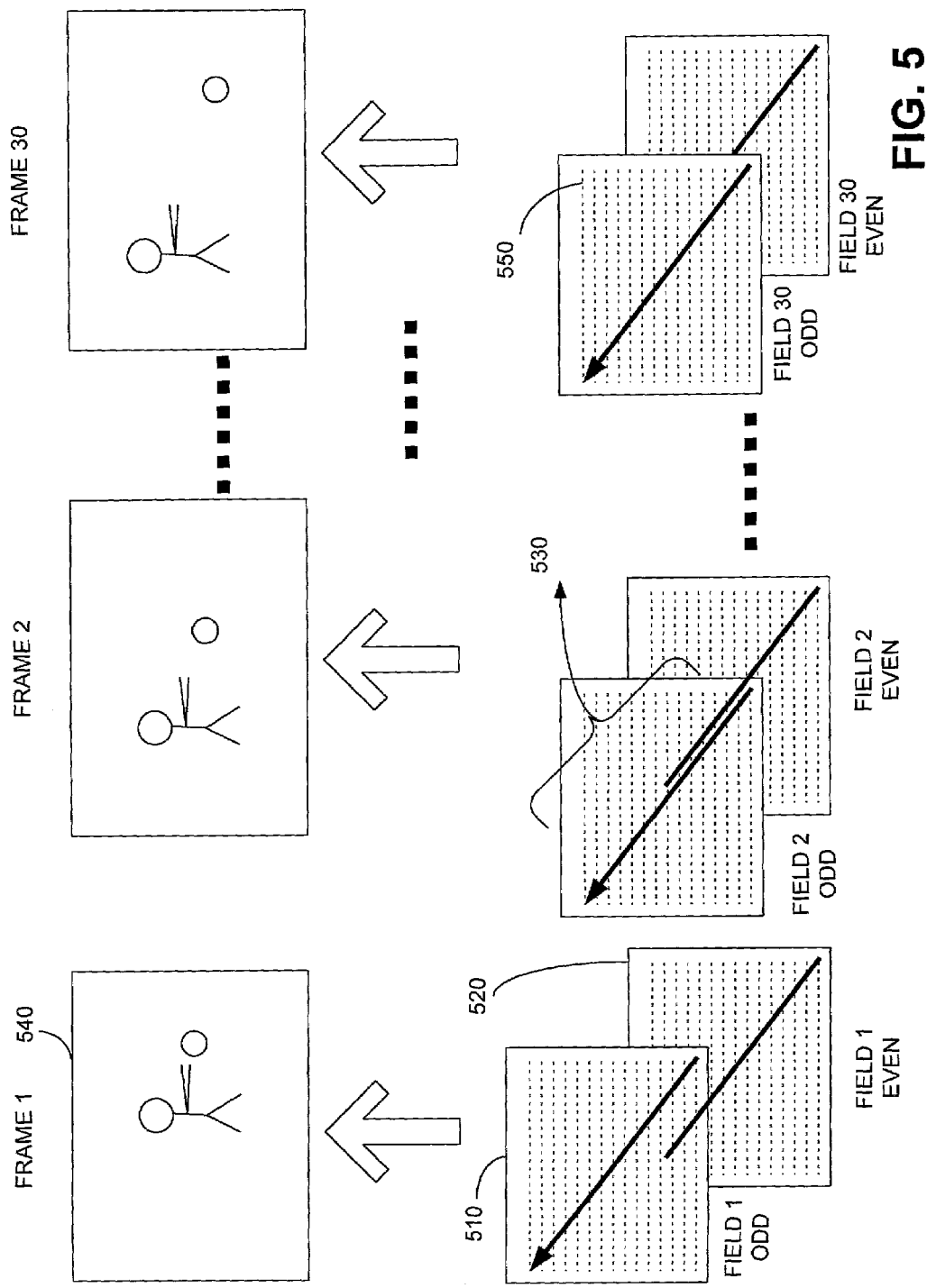
FIG. 5 illustrates the concept of video blanking intervals in a video signal, in accordance with one embodiment of the invention.

FIG. 5 illustrates the concept of video blanking intervals in a video signal, in accordance with one embodiment of the invention. Video pictures in the United States are typically composed of 526 horizontal lines created by an electron beam located in the television. The electron beam writes one line 550 at a time on a picture tube, with one still image or frame 540 of a video picture created by the 525 lines. The illusion of motion is created by repeating this frame creation process 30 times each second (i.e. 30 frames per second). To minimize flicker and to improve bandwidth, an interlacing system is used whereby each frame 540 is divided into two separate fields containing half of the picture information. The first field 510 is created by the electron beam sequentially writing all of the odd numbered lines. A vertical synchronization pulse then returns the beam to the top of the screen to create the second field 520 by writing all of the even numbered lines. Thus, the 30 frames per second equate to 60 fields per second.

Countries that adhere to the National Television Standards Committee (e.g. the United States) have several types of electronic information that comprise the video image, one of which is the vertical synchronization pulse. This pulse controls the period when the TV screen goes blank between the end of one field (e.g. odd numbered field 510) and the beginning of the second field (e.g. even numbered field 520). This interval is called the vertical blanking interval (VBI) 530. There are approximately 24 lines during this period that carry no picture modulation. Lines 17 through 20 may carry test signals indicating modulation reference values, cue, and control signals. Lines 21 through 23 may carry coded information regarding local or network origination, closed captioning, or other identification. With continued reference to FIGS. 2 & 4, the processor 244 clocks the retrieval of the subscriber ID information that was stored in flash 251 or DRAM 252 in step 410 with the video frames of the media presentation, and delivers these program signals to the RF output system 248. RF output system 248 inserts the subscriber ID information during the vertical blanking interval VBI 530 (FIG. 5) of each frame, or a varying sequence of frames. The actual insertion of textual information during the VBI is well known in the art and need not be discussed further.

The method of FIG. 4 may also be implemented at the head end 11. For a non-limiting example, the head end 11 includes a billing manager system 375 that is loaded with subscriber identification information as part of the initial subscription by the user to the cable television service provider (Step 400 of FIG. 4). Alternatively, the billing manager system 375 may be external to the head end 11 and communicated to and from the head end 11 through a gateway. The DHCT 16 has a media access control (MAC) address that is recognized by the head end 11. Upon the user entering a program request, such as a Media On Demand request, the DHCT 16 communicates this program request through the MOD application 263 (FIG. 2) to the DNCS 323 (FIG. 3) via the out of band channel, as described previously (Step 410 of FIG. 4). The DNCS 323 routes a program request and the corresponding MAC address to the billing manager system 375. The DNCS 323 may also request from the billing manager system 375 a corresponding subscriber identity (i.e. subscriber ID information) based on the MAC address. As an alternative embodiment, the MAC address may also have user PIN numbers associated with the MAC address corresponding to the particular user of the DHCT 16, as described previously. The billing manager system 375 routes the subscriber ID information to the DNCS 323. The DNCS 323 creates a program or session, identifies that session with the subscriber ID information, and communicates to the VOD content server 322 to effect delivery of the selected program. The VOD content server 322 inserts the subscriber ID information into the requested MOD program and delivers the MOD program with the subscriber ID information to the DHCT 16 via the QAM group 324 (Step 420, FIG. 4). At the DHCT 16, the subscriber ID information is retrieved from the media presentation and inserted during the vertical blanking interval VBI 530 of the presentation of the MOD program, as described in association with the insertion step 420 of FIG. 4.

Figure 6:
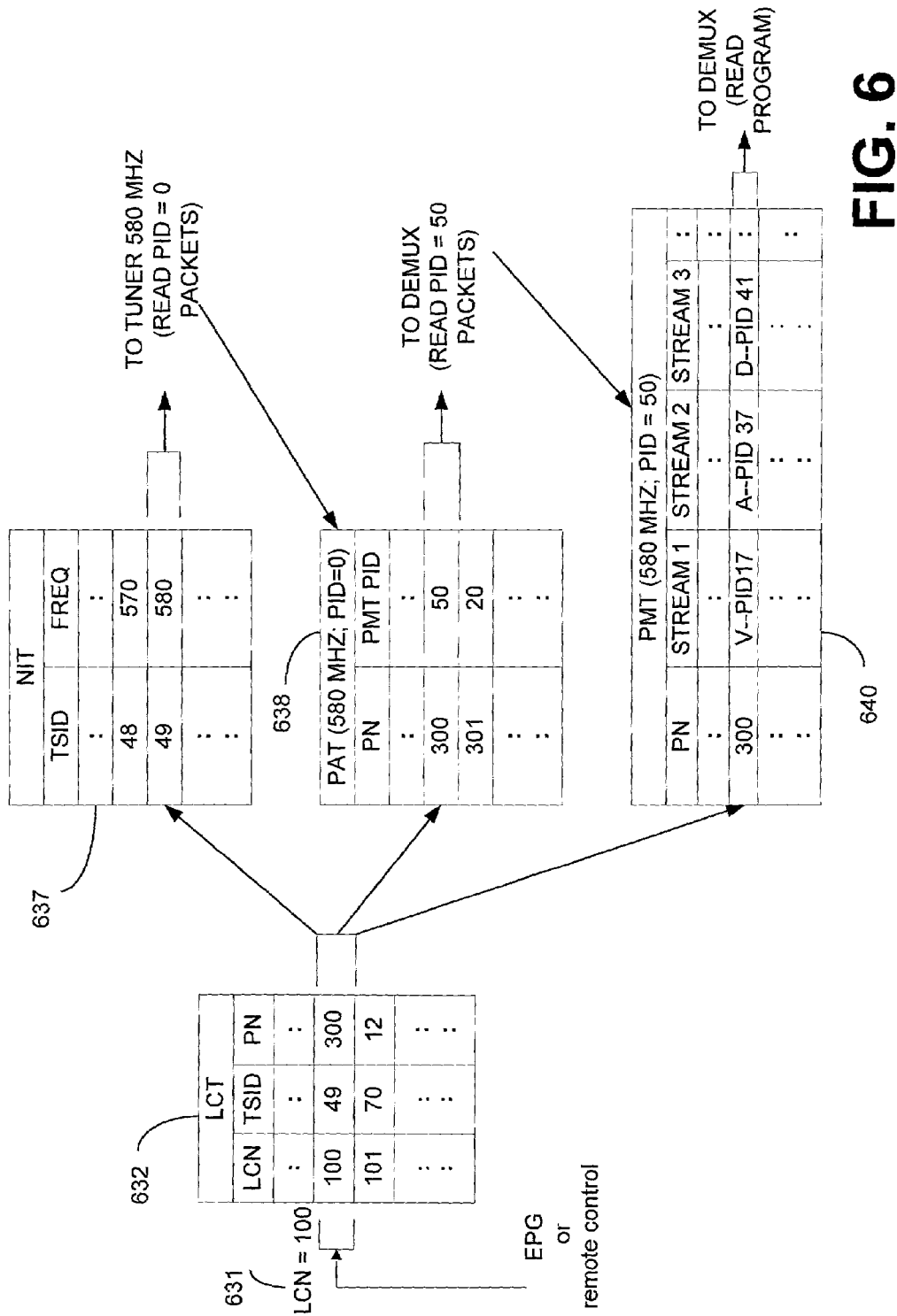
FIG. 6 illustrates the concept of MPEG-PIDs in video signals, in accordance with one embodiment of the invention.
Figure 7:
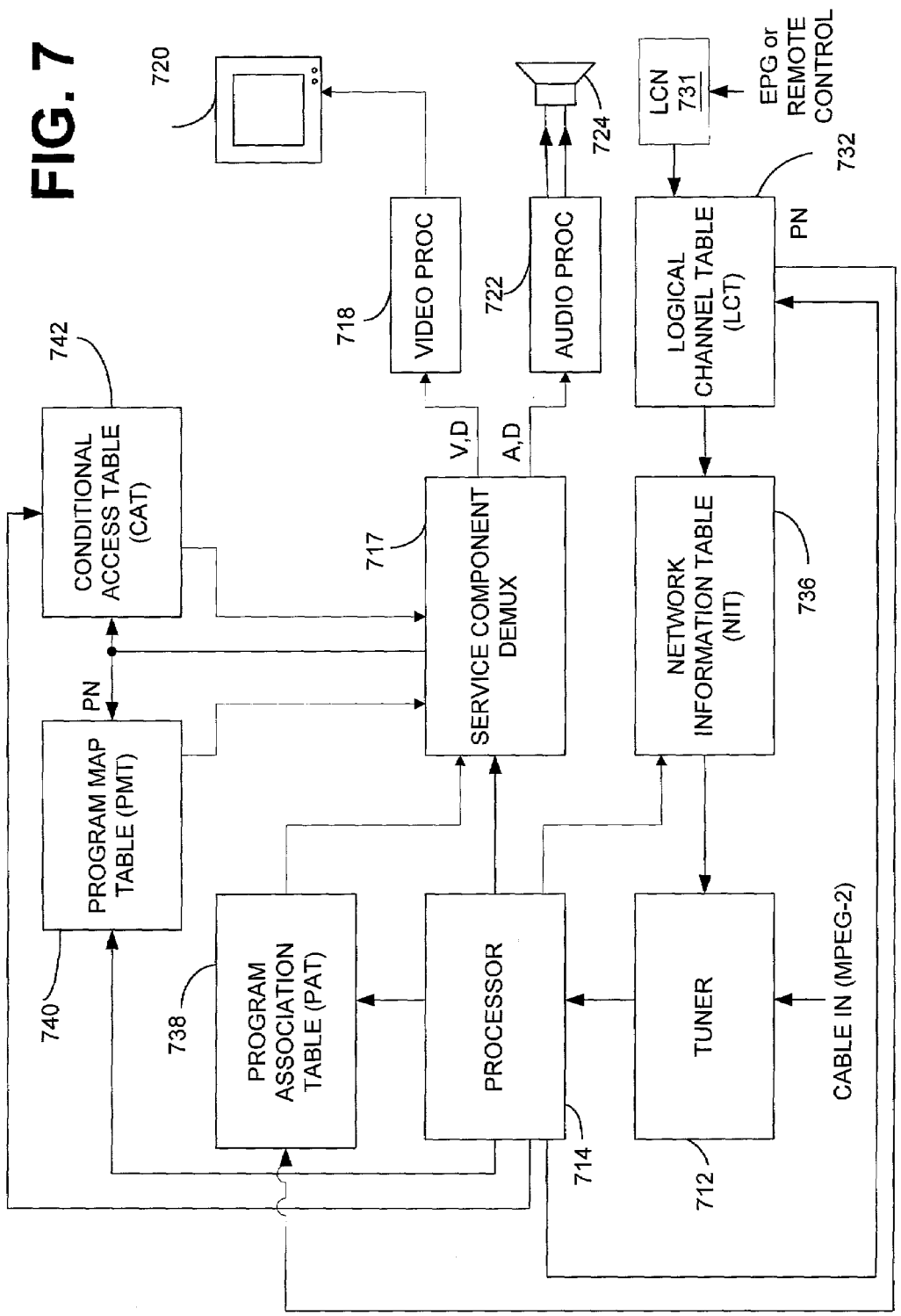
FIG. 7 is a block diagram of an example MPEG-2 decoder circuitry that may be resident in the DHCT illustrated in FIG. 2, in accordance with one embodiment of the invention.

In another implementation, the subscriber ID information may be transported from the head end 11 as part of the data packet of a transport stream, such as, for a non-limiting example, an MPEG-2 transport stream. FIGS. 6 & 7 relate to one of many possible implementations of an MPEG-2 system. Further information regarding MPEG-2 decoders and table mapping can be found by referring to U.S. Pat. No. 5,600,378, the contents of which are hereby incorporated by reference. Note that the MPEG-2 stream may or may not be encrypted. As would be well known to those skilled in the art, MPEG is an acronym for moving picture experts group, which was formed by the International Standards Organization to set standards for audio and video compression and transmission. The "-2" signifies that this is the second officially recognized MPEG standard. In video, compression is essentially bit rate reduction or data reduction. Bit rate reduction or data reduction equates to less data to store and consequently miniaturization of hardware. Compression also allows for a reduction in transmission bandwidth. Thus for an allotted bandwidth, compression improves the quality of the signal and makes more efficient use of bandwidth than, say, analog transmission. This feature makes video applications such as Video On Demand economically viable. Note that MPEG is more than a compression standard, as it also standardizes the protocol and syntax to multiplex audio data with video data to produce a digital equivalent of a television program. The bitstream output after compression is called an elementary stream, which carries a single video or audio signal. Elementary streams are packetized (called packetized elementary streams) to improve the performance of transmission and storage systems. These packets have discrete data or code portions to identify the bit stream and aid in synchronization. Combining these packets into packs along with system clock references enable the decoder to recreate the encoder clock.

To create a program stream (i.e. an audio and video program with their associated data information), the audio elementary stream must be combined or multiplexed and clocked with the video elementary stream. Multiplexing many program streams creates a transport stream. Transport streams are also packetized, but unlike the packetized elementary streams, transport stream packets are always 188 bytes long to ease the insertion of error correction codes and interleaving. Transport stream packets always begin with a header that uniquely identifies it. Although each elementary stream has a different Packet Identification Code (PID), a processor or demultiplexer or any decoding element must be told what these PIDS are and what audio belongs to what video. A 13-bit PID is included in the transport stream header to aid a demultiplexer in searching for a particular elementary stream. This 13 bit PID identifies, via Program Specific Information (PSI) tables (as described below), the contents of the data contained in each transport stream packet. In one implementation, the subscriber ID information and the selected program is encoded by encoding circuitry in the VOD content server 322 to comprise an MPEG-2 stream. Encoding circuitry for MPEG-2 streams are well known in the art and need not be described any further. Alternatively, the encoding circuitry may be located external to the VOD content server 322, or the encoder may be located anywhere within or external to the head end 11. The DNCS 323 communicates to the DHCT 16 via the out of band signal what PID to extract for the selected program and corresponding subscriber ID information as will be described in relation to FIGS. 6 & 7. The MPEG-2 stream is delivered from the VOD content server 322 to the DHCT 16 via the QAM group 324. The VOD content server 322 may list the subscriber identification information in the data portion of the program PID associated with the requested program number. The decoder circuitry at the DHCT 16 would search for the subscriber identification information based on the location indicated in a program map table as described below.

FIG. 6 is one of many embodiments illustrating the interaction of the tables within the PSI table to identify a particular program. The logical channel table (LCT) 632 provides the mapping between a logical channel number (LCN) 631 representing a selected service and the transport stream/program number on which the service can be found. The Network Information Table (NIT) 636 specifies the mapping between transport stream IDs (TSIDs) and network physical parameters, such as tuning frequencies. The Program Association Table (PAT) 638 is transmitted from the head end 11 at regular intervals and contains a list of all of the programs in a particular transport stream. The PAT 638 is always sent in packets with PID=0. The PAT 638 associates a program number with the transport packets that carry the Program Map Table (PMT) 640 for that program. Each program is described by its own PMT 640, and the PIDs of the PMTs are contained in the PAT 638. The PMT 640 specifies the PIDs and therefore which elementary streams and associated data form each program.

Referring now to FIG. 7, with continued reference to FIG. 6, FIG. 7 is a block diagram of an example MPEG-2 decoder circuitry, in accordance with one embodiment of the invention. In one of many different embodiments, when a viewer selects (e.g. with a remote) a particular program from, by way of non-limiting example, an Electronic Program Guide, that selection is associated with the LCN 631. The LCN 631 defines a service by its number (PN) and transport stream ID (TSID). The TSID is used as a key to the NIT 636 to determine the frequency carrying the desired channel. The transport stream carried at the selected frequency is provided to processor 714, which selects from the transport stream those data packets having PIDs known to contain the various control data and PSI tables. The PN is used as a key to the PAT 638 to retrieve the PID on the specified transport stream that carries the PMT 640 defining the desired channel. The demultiplexer 717 receives the transport stream from the processor 714 as well as the information (i.e. PIDs) from the PAT 638, PMT 640, and CAT 742 (a conditional access table for encryption) needed to demultiplex the service components of the selected program from the transport stream. The demultiplexer 717, as configured by the processor 714, searches for the subscriber ID information as indicated by the PMT 640, which may be located in a data PID, for a non-limiting example, PID 41. The demulitplexing technique, as well as the technique for generating the table parameters, is well known to those skilled in the art. Note that the subscriber identification information is simply data to be transported from the head end 11 to the DHCT 16. The subscriber identification information is not required to identify the transport stream at the DHCT 16 for demultiplexing, nor is it required to encrypt or decrypt the media presentation. It is simply data that the DHCT 16 will retrieve and insert into the media presentation for tracing copying. After the subscriber identification information is stored in system memory 249, the process of demultiplexing and inserting is as described in relation to FIG. 2*a*.

In an alternative embodiment, the subscriber may enter the subscriber ID information into the DHCT 16, and this subscriber identification information may be communicated via the out of band pathway to the head end 11 for storage at the head end 11 billing manager system 375.

In another embodiment, a subscriber request for a MOD or PPV program may cause the head end 11 to send the subscriber ID information resident in the billing manager system 375 to the DHCT 16 via the out of band pathway or channel to be stored in DRAM 252 for later insertion into the vertical blanking interval VBI 530 of the video picture.

Another embodiment recognizes the possibility of PID remappers, and the possibility of stripping PIDs and consequently destroying the trace to the illegal copyist. By way of non-limiting example, a copyist may seek to delete all data PIDs under the assumption that subscriber identification information would be implanted as data. Subscriber identification information may be implanted as its own write or copy protected packet, or embedded in the MPEG stream as data and as its own packet.

The processing and insertion systems, such as but not limited to the encoding and decoding circuitry, and the multiplexing circuitry of the embodiments of the present invention can be implemented in hardware, software, firmware, or a combination thereof. If one of the embodiments are implemented in software, it is executed by a suitable instruction execution system. If one of the embodiments are implemented in hardware, as in an alternative embodiment, it can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

The invention claimed is:

1. A digital home communication terminal (DHCT) of a cable television system, the DHCT comprising:
   a memory located in the DHCT for storing subscriber identification information; and
   a processor located in the DHCT, the processor configured to receive the subscriber identification information from the memory and a media presentation from a media services server device of the cable television system;
   wherein the processor is further configured to insert the subscriber identification information into the media presentation;
   wherein the processor is configured to insert textual information of the subscriber identification information into the media presentation during a vertical blanking interval of the media presentation; and
   wherein the processor is further configured to ensure that the textual information of the subscriber identification information is completely undetectable to a viewer of the media presentation throughout an entire presentation of the media presentation.

2. The DHCT of claim 1, wherein the processor is configured to receive the media presentation from an in band pathway delivered from the media services server device.

3. The DHCT of claim 1, wherein the processor is configured to receive the subscriber identification information from a remote control device.

4. The DHCT of claim 1, wherein the processor is configured to transmit a media presentation request to an out of band pathway delivered to the media services server device.

5. The DHCT of claim 1, wherein the subscriber identification information is write protected.

6. The DHCT of claim 1, wherein the processor is further configured to demultiplex, decrypt, and decompress.

7. The DHCT of claim 1, wherein the processor is further configured to insert the textual information of the subscriber identification information into the media presentation to enhance tracing copying of the media presentations.

8. The DHCT of claim 1, wherein the processor is further configured to receive an identifier signal identifying the DHCT.

9. The DHCT of claim 8, wherein the processor is further configured to associate the identifier signal with the subscriber identification information.

10. The DHCT of claim 9, wherein the processor is further configured to receive the subscriber identification information from a billing manager system of the media services server device.

11. The DHCT of claim 1, wherein the media presentation is transmitted as part of a data packet of an MPEG transport stream.

12. A method for inserting subscriber identification information into media presentations, the method comprising steps of:
   receiving subscriber identification information;
   storing the subscriber identification information in memory of a digital home communication terminal (DHCT) of a cable television system;
   receiving a subscriber request for a media presentation at the DHCT;
   receiving the media presentation from a media services server device of the cable television system;
   inserting the subscriber identification information into the media presentation, wherein inserting the subscriber identification information occurs at the DHCT, and wherein the DHCT inserts textual information of the subscriber identification information into the media presentation during a vertical blanking interval of the media presentation; and
   configuring the textual information of the subscriber identification information to be completely undetectable to a viewer of the media presentation throughout an entire presentation of the media presentation.

13. The method of claim 12, wherein receiving the subscriber identification information occurs at the DHCT.

14. The method of claim 13, wherein the DHCT receives the subscriber identification information and the subscriber request for the media presentation from a remote control device.

15. The method of claim 12, wherein the media services server device transports the media presentation to the DHCT as a compressed, encoded, and encrypted media stream.

16. The method of claim 12, wherein the subscriber identification information is write protected.

* * * * *